United States Patent
Baba

(10) Patent No.: US 10,564,801 B2
(45) Date of Patent: Feb. 18, 2020

(54) METHOD FOR COMMUNICATING VIA VIRTUAL SPACE AND INFORMATION PROCESSING APPARATUS FOR EXECUTING THE METHOD

(71) Applicant: COLOPL, Inc., Tokyo (JP)

(72) Inventor: Naruatsu Baba, Tokyo (JP)

(73) Assignee: COLOPL, INC., Tokyo (JP)

( * ) Notice: Subject to any disclaimer, the term of this patent is extended or adjusted under 35 U.S.C. 154(b) by 5 days.

(21) Appl. No.: 15/989,797

(22) Filed: May 25, 2018

(65) Prior Publication Data
US 2018/0373414 A1    Dec. 27, 2018

(30) Foreign Application Priority Data

May 26, 2017 (JP) ................................ 2017-104927

(51) Int. Cl.
| | |
|---|---|
| *G06T 15/00* | (2011.01) |
| *G06F 3/0481* | (2013.01) |
| *G06T 19/00* | (2011.01) |
| *G06T 19/20* | (2011.01) |
| *G06T 7/70* | (2017.01) |
| *G02B 27/01* | (2006.01) |

(Continued)

(52) U.S. Cl.
CPC ..... *G06F 3/04815* (2013.01); *G02B 27/0172* (2013.01); *G06F 3/013* (2013.01); *G06F 3/014* (2013.01); *G06F 3/017* (2013.01); *G06T 7/20* (2013.01); *G06T 7/70* (2017.01); *G06T 19/003* (2013.01); *G06T 19/20* (2013.01); *G02B 2027/0138* (2013.01)

(58) Field of Classification Search
CPC ....... G06T 19/00; G06T 19/003; G06T 19/20; G06F 3/04815
See application file for complete search history.

(56) References Cited

U.S. PATENT DOCUMENTS

2014/0375635 A1    12/2014  Johnson et al.
2017/0053450 A1*   2/2017   Rodriguez .............. G06T 7/579
(Continued)

FOREIGN PATENT DOCUMENTS

JP        2015-15021 A       1/2015

OTHER PUBLICATIONS

Notice of Allowance in JP Application No. 2017-104927, dated Nov. 14, 2017. 6pp.

*Primary Examiner* — Charles Tseng
(74) *Attorney, Agent, or Firm* — Hauptman Ham, LLP

(57) ABSTRACT

A method includes defining a virtual space containing an avatar object and the avatar object includes a virtual head and a virtual body. The method includes receiving first information, wherein the first information contains information indicating a relationship between a first direction indicating a direction in which a real body is facing and a second direction indicating a direction in which a real head is facing. The method includes determining in which of a first mode or a second mode the avatar object is to be controlled. The method includes controlling the avatar object without synchronizing movement of the virtual head and movement of the virtual body in response the first mode being set. The method includes controlling the avatar object so that the movement of the virtual head and the movement of the virtual body are synchronized with each other in response the second mode being set.

20 Claims, 20 Drawing Sheets

(51) Int. Cl.
*G06F 3/01* (2006.01)
*G06T 7/20* (2017.01)

(56) References Cited

U.S. PATENT DOCUMENTS

2017/0109935 A1* 4/2017 Loffler .................... G06F 3/012
2017/0206707 A1* 7/2017 Guay .................. G06F 16/2246
2019/0088018 A1* 3/2019 Shenton .................. A63F 13/26

* cited by examiner

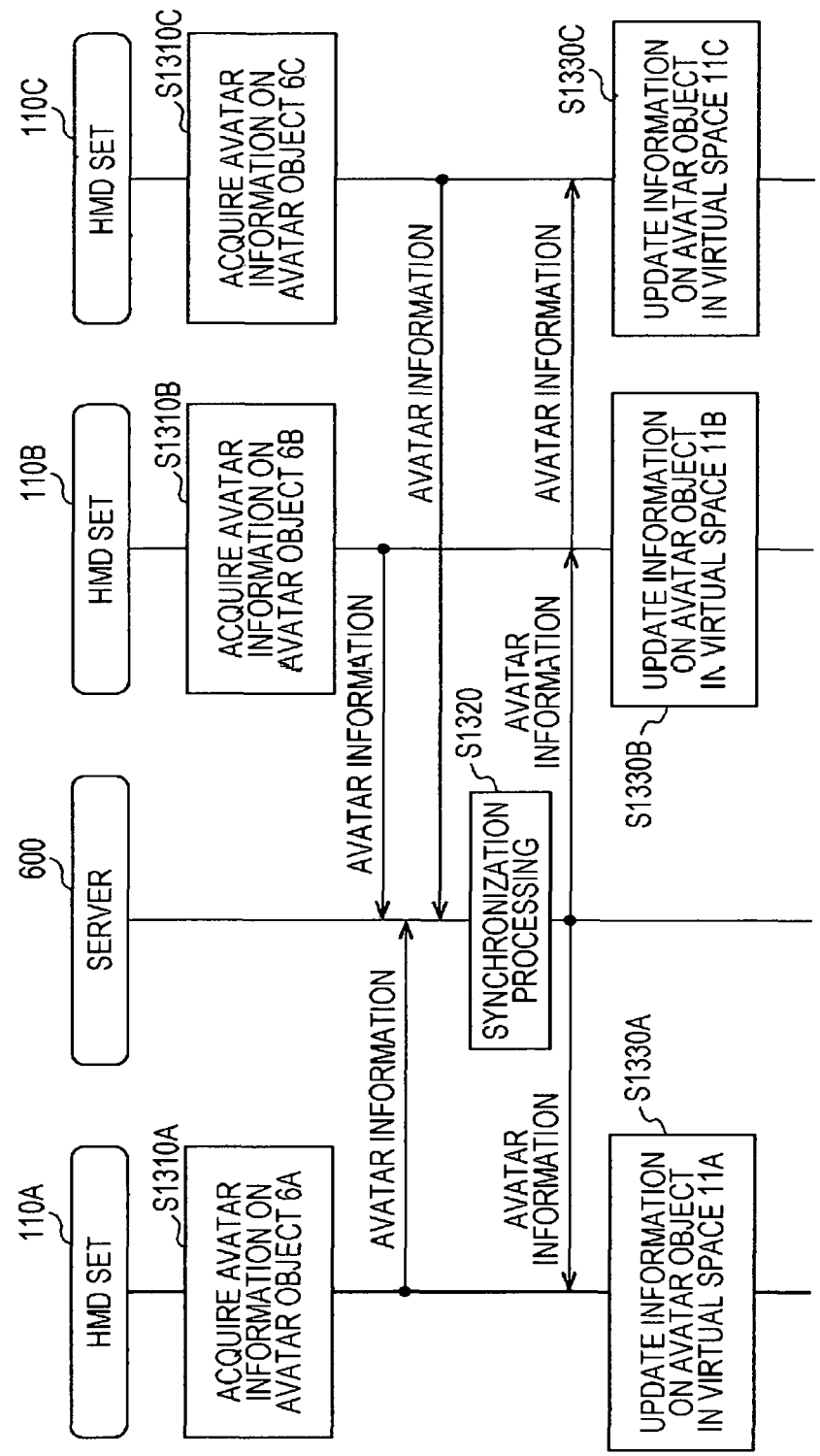

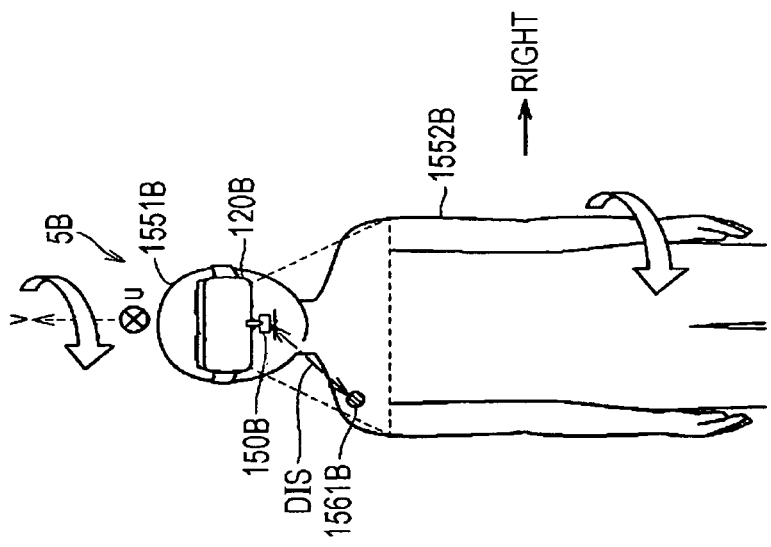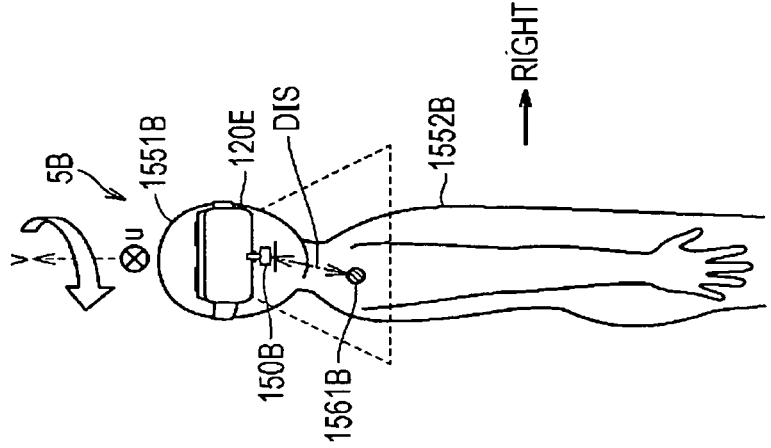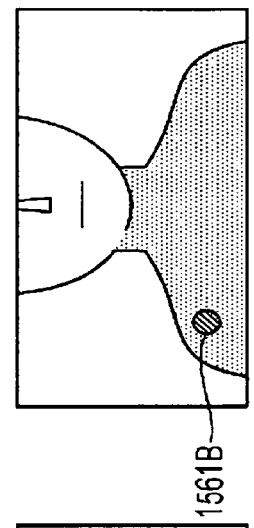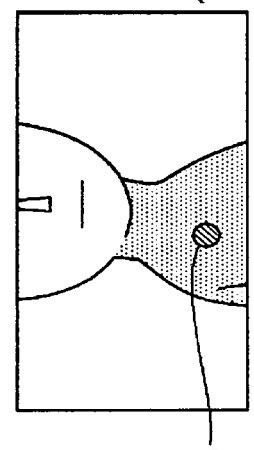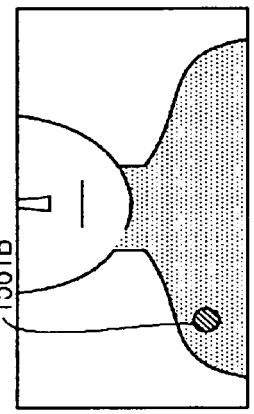

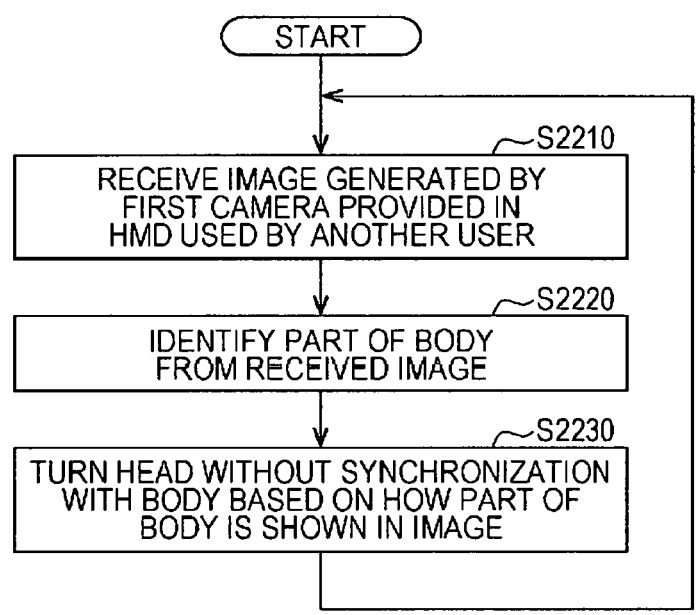

METHOD FOR COMMUNICATING VIA VIRTUAL SPACE AND INFORMATION PROCESSING APPARATUS FOR EXECUTING THE METHOD

RELATED APPLICATIONS

The present application claims priority to Japanese Application No. 2017-104927, filed on May 26, 2017, the disclosure of which is hereby incorporated by reference herein in its entirety.

TECHNICAL FIELD

This disclosure relates to a technology of controlling an avatar arranged in a virtual space, and more particularly, to a technology of controlling a motion of the avatar.

BACKGROUND

There is known a technology of providing virtual reality with use of a head-mounted device (HMD). There is proposed a technology of arranging respective avatars of a plurality of users in a virtual space for communication among the plurality of users via those avatars.

In order to promote communication among users in a virtual space, there has been proposed a technology for translating a motion of a user in a real space to an avatar in a virtual space. For example, regarding a technology of acquiring a motion of a user in a real space, in Japanese Patent Application Laid-open No. 2015-015021 (Patent Document 1), there is described a method involving "generating a three-dimensional representation of a subject by: comparing a depth image of the subject with a plurality of representative images, each representative image being associated with an individual parametric model of the subject; identifying one of the plurality of representative images as a representative image most similar to the depth image of the subject; selecting the parametric model associated with the representative image most similar to the depth image; and fitting the selected parametric model to the depth image of the subject" (see "Abstract").

PATENT DOCUMENTS

[Patent Document 1] JP 2015-015021 A

SUMMARY

According to at least one embodiment of the present description, there is provided a method of communicating via a virtual space. The method includes defining a virtual space to be associated with a first user, the virtual space including a first avatar object corresponding to a second user and the first avatar object includes a first virtual head and a first virtual body. The method further includes receiving first information, the first information containing information indicating a relationship between a first direction indicating a direction in which a real body of the second user is facing and a second direction indicating a direction in which a real head of the second user is facing. The method further includes determining in which of a first mode and a second mode the first avatar object is to be controlled based on the first information. The method further includes controlling the first avatar object without synchronizing the first virtual head and the first virtual body in response to a fact that the first mode is set; and controlling the first avatar object so that the first virtual head and the first virtual body are synchronized with each other in response to a fact that the second mode is set.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 13 A sequence diagram of processing to be executed by a system including an HMD interacting in a network according to at least one embodiment of this disclosure.

FIG. 15A A diagram of processing of turning a head and body of an avatar object according to at least one embodiment of this disclosure.

FIG. 15B A diagram of processing of turning a head and body of an avatar object according to at least one embodiment of this disclosure.

FIG. 15C A diagram of processing of turning a head and body of an avatar object according to at least one embodiment of this disclosure.

FIG. 15D A diagram of processing of turning a head and body of an avatar object according to at least one embodiment of this disclosure.

FIG. 15E A diagram of processing of turning a head and body of an avatar object according to at least one embodiment of this disclosure.

FIG. 15F A diagram of processing of turning a head and body of an avatar object according to at least one embodiment of this disclosure.

FIG. 22 A flowchart of processing of motion of the head and the body of the avatar object in a case where an image is used according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
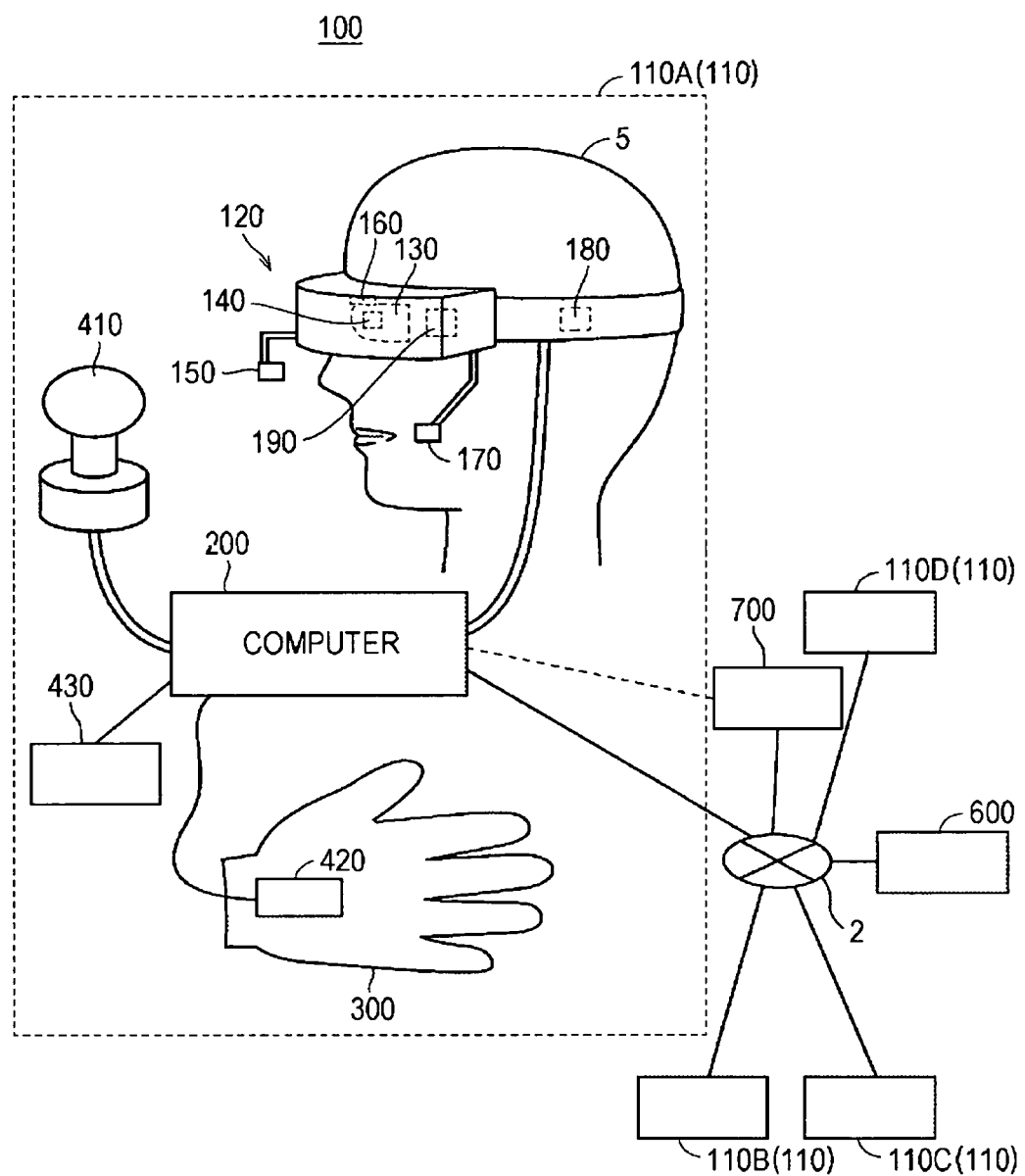
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
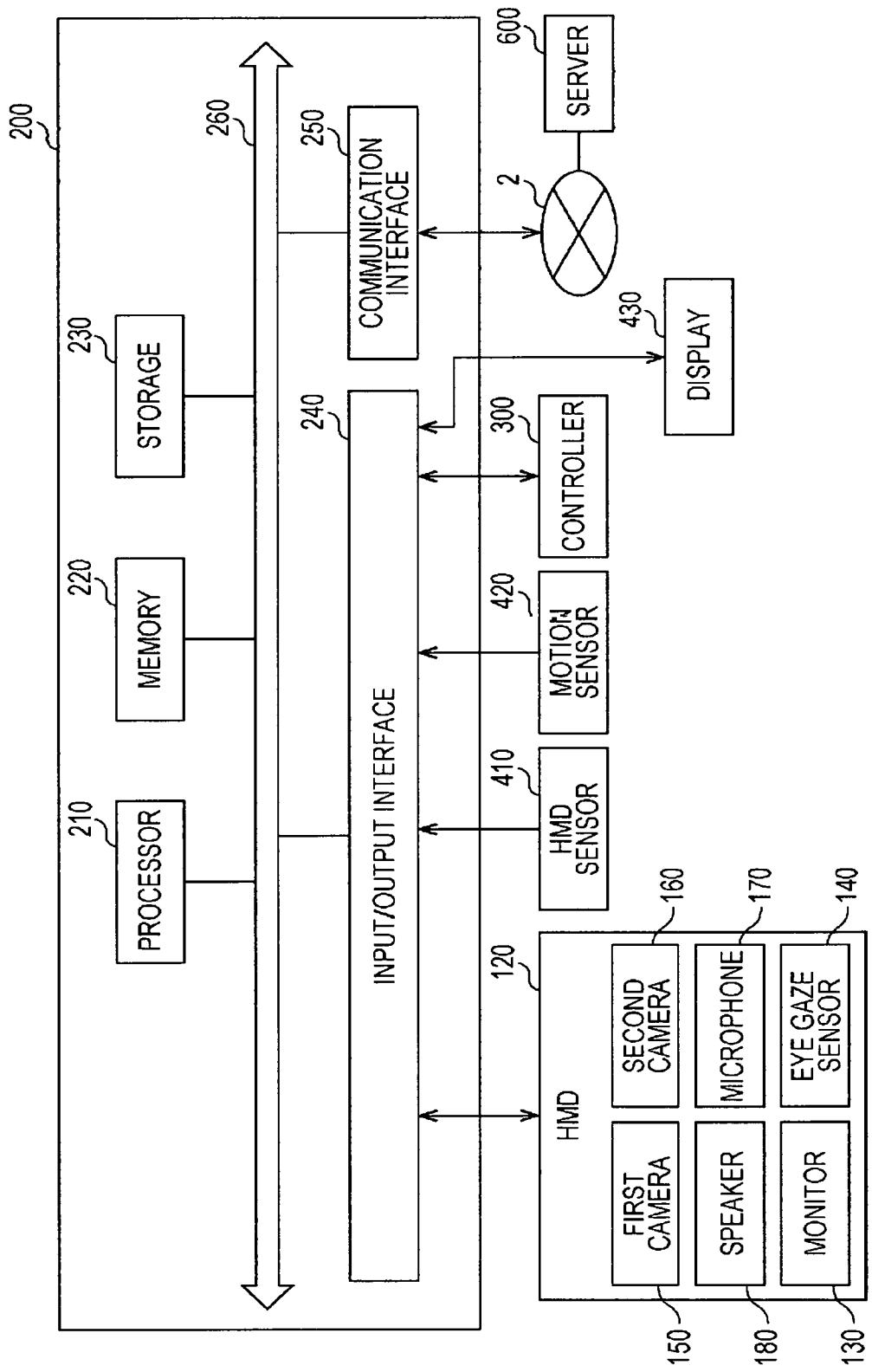
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
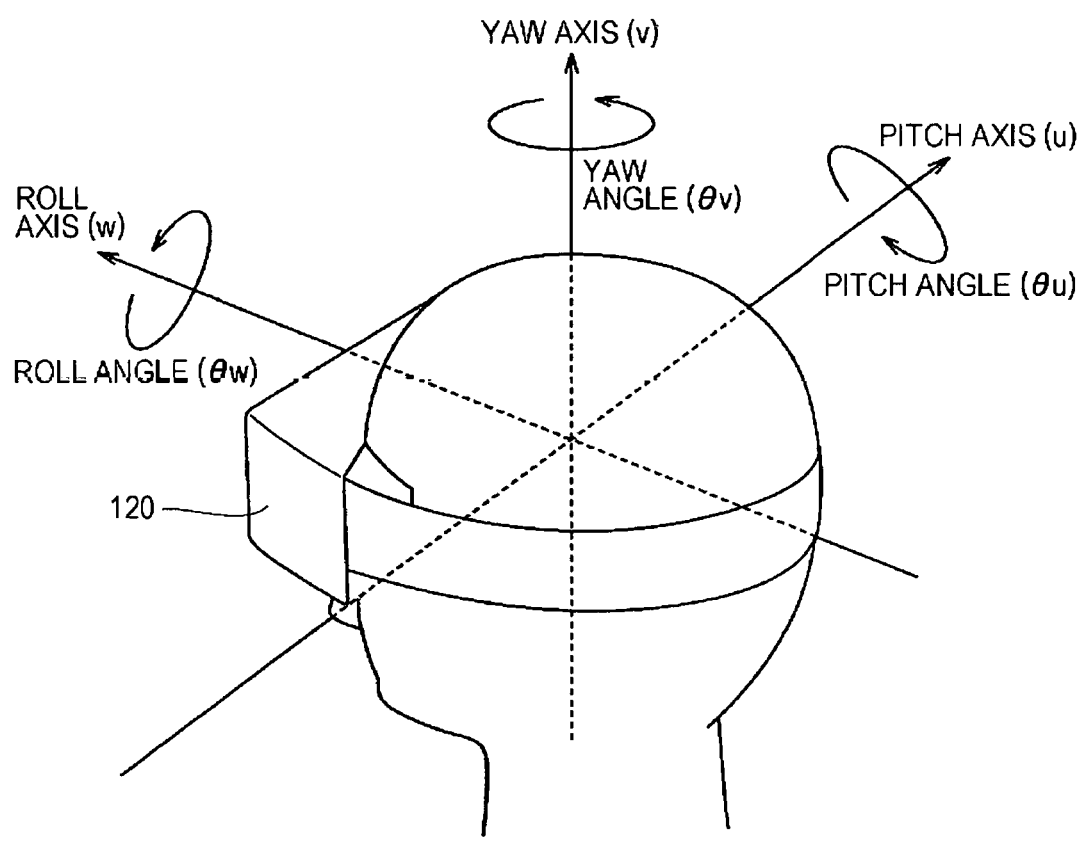
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle (θu), a yaw angle (θv), and a roll angle (θw) of the HMD 120 in the uvw visual-field coordinate system. The pitch angle (θu) represents an inclination angle of the HMD 120 about the pitch axis in the uvw visual-field coordinate system. The yaw angle (θv) represents an inclination angle of the HMD 120 about the yaw axis in the uvw visual-field coordinate system. The roll angle (θw) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
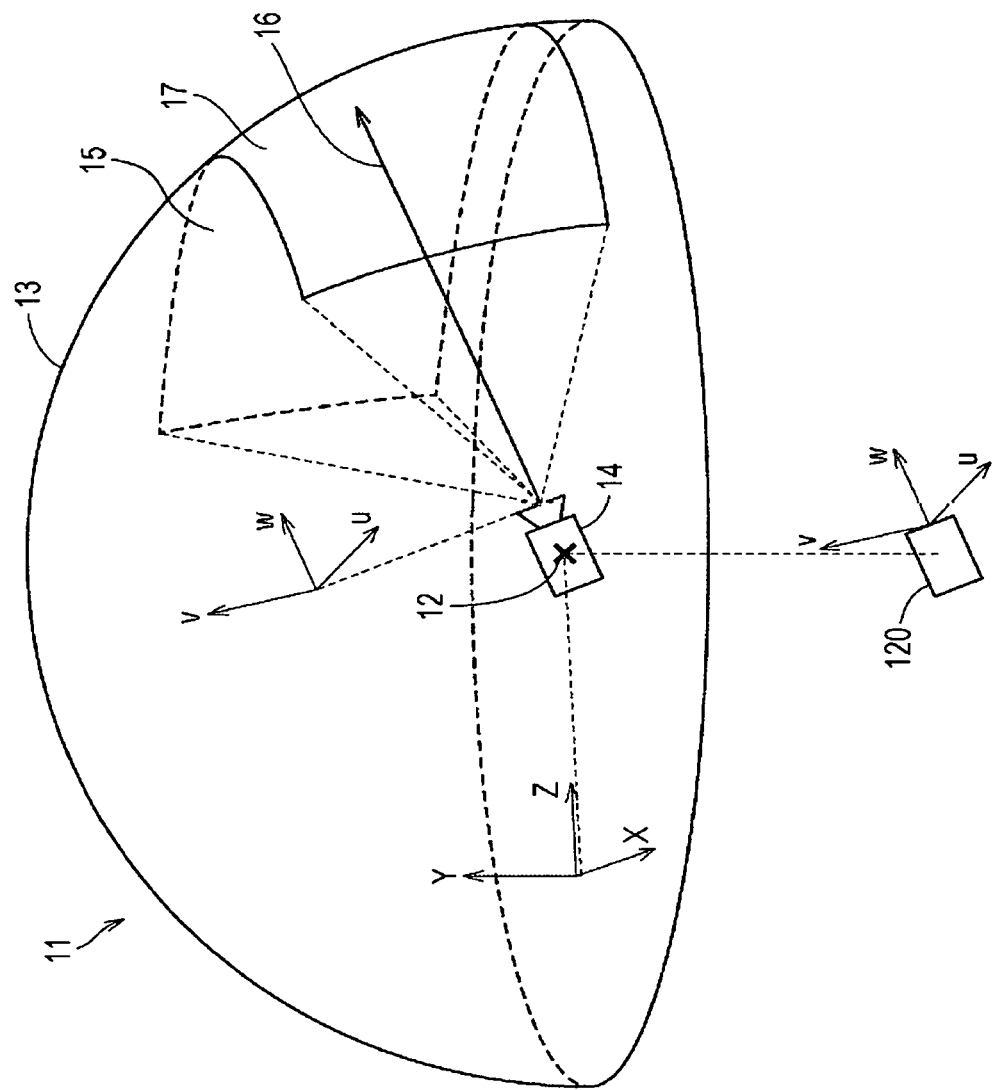
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
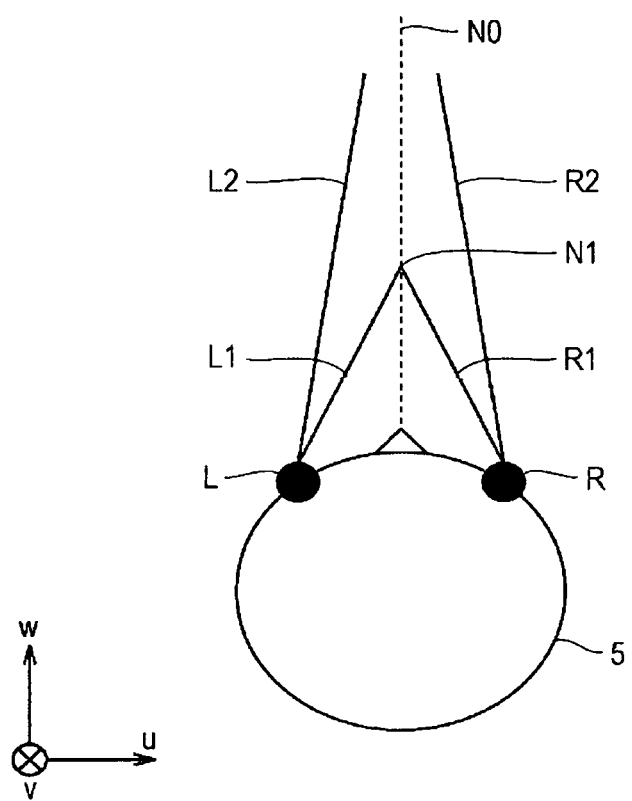
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
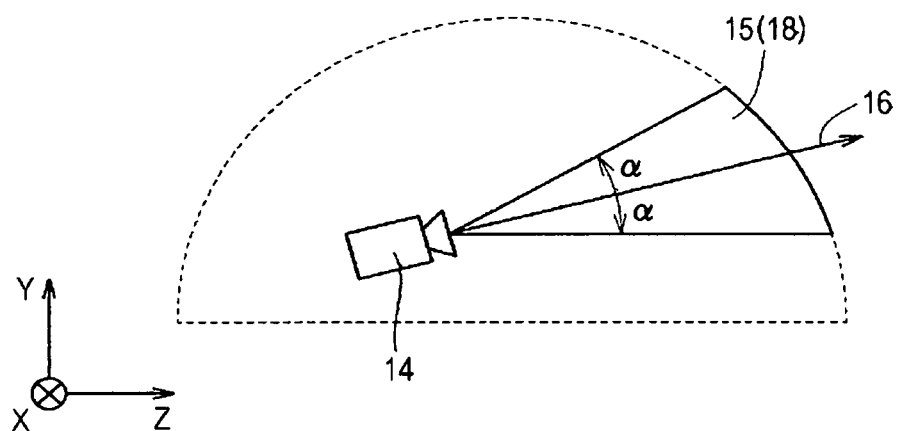
FIG. 6 A diagram of a YZ cross section obtained by viewing a field-of-view region from an X direction in the virtual space according to at least one embodiment of this disclosure.
Figure 7:
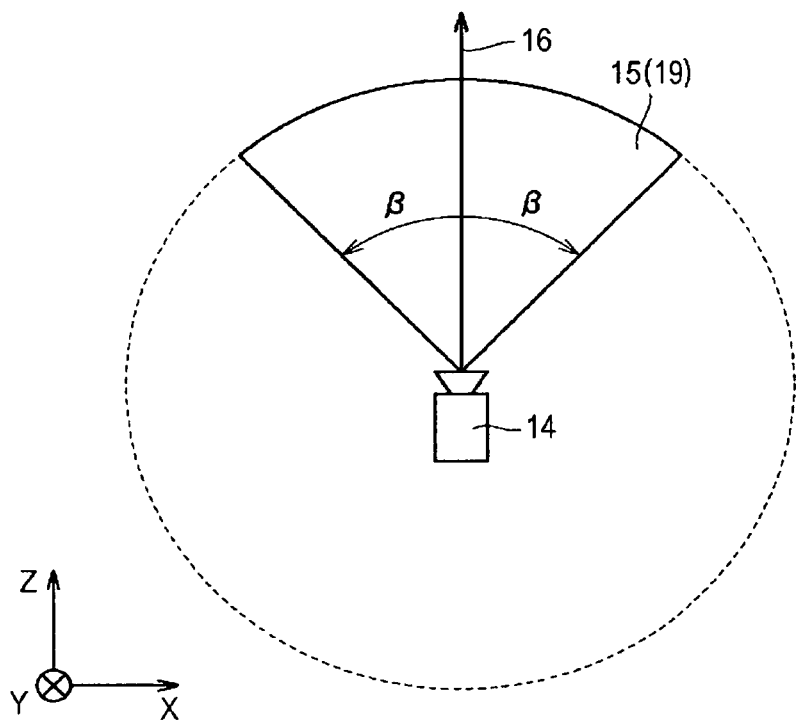
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle $\alpha$ from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth $\beta$ from the reference line of sight 16 serving as the center in the virtual space 11 as the region 19. The polar angle $\alpha$ and $\beta$ are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to apart of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
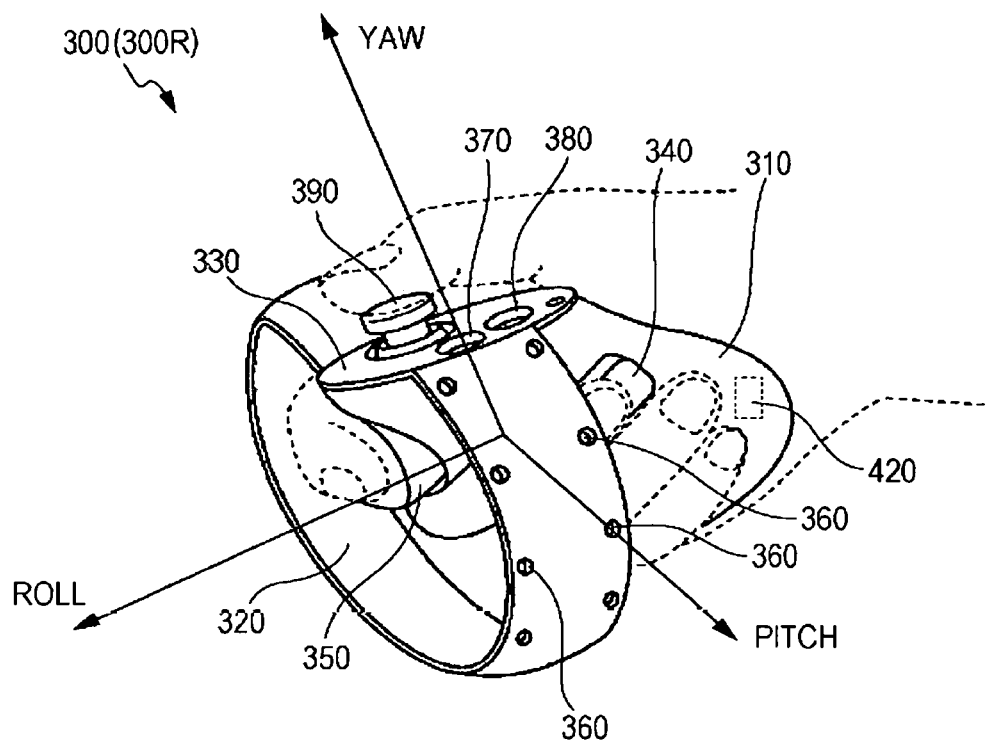
FIG. 8A A diagram of a schematic configuration of a controller according to at least one embodiment of this disclosure.
Figure 8B:
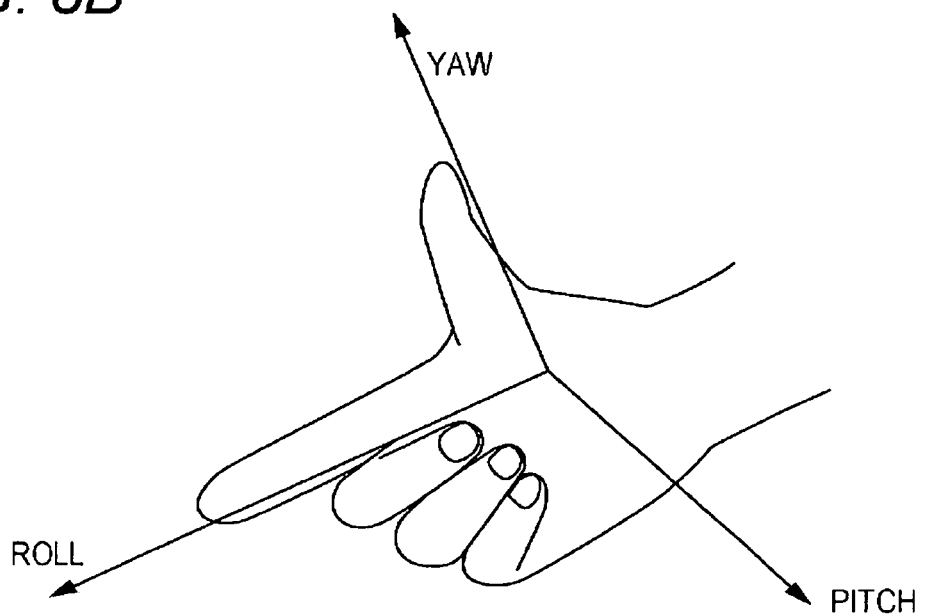
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
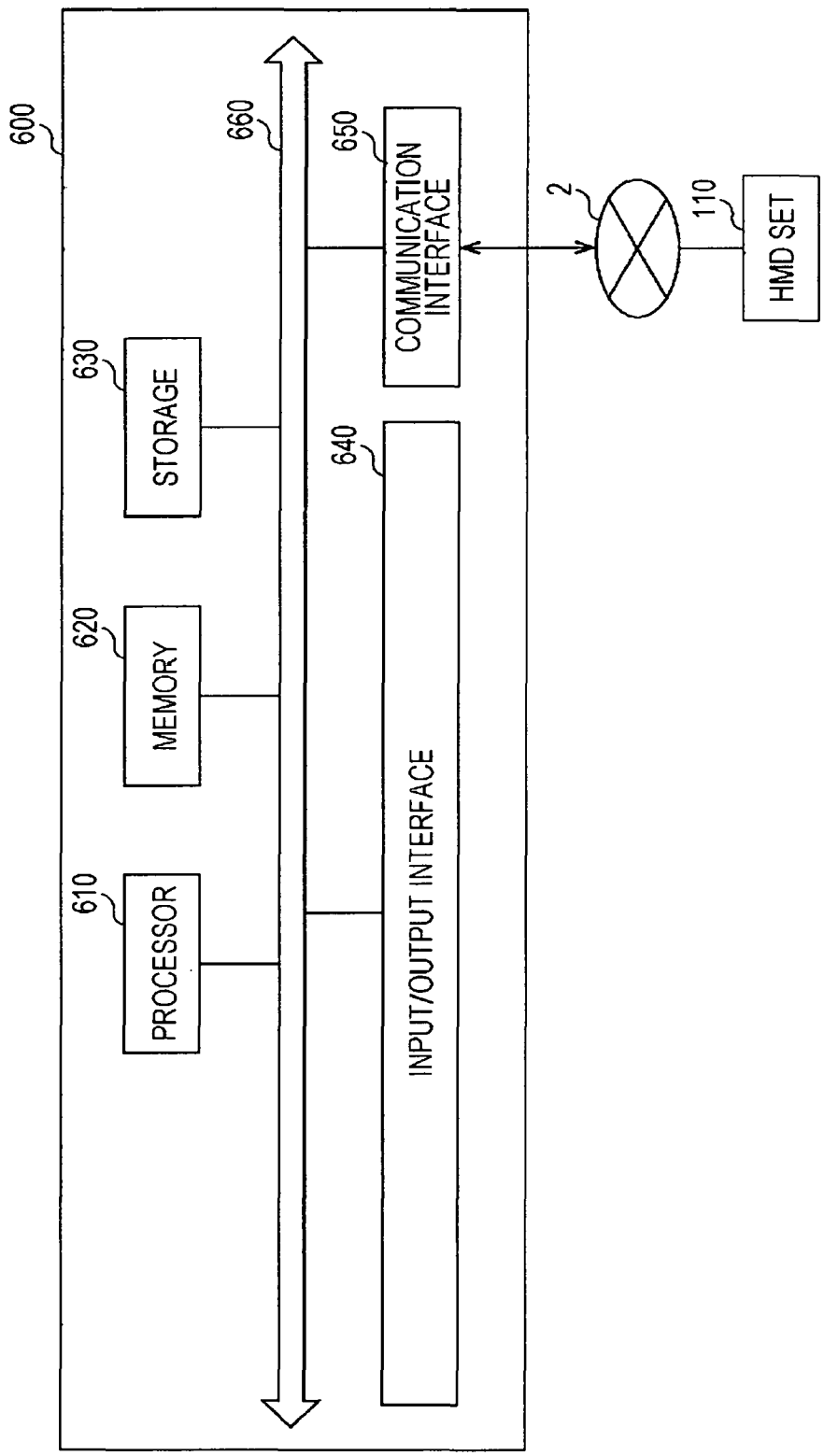
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
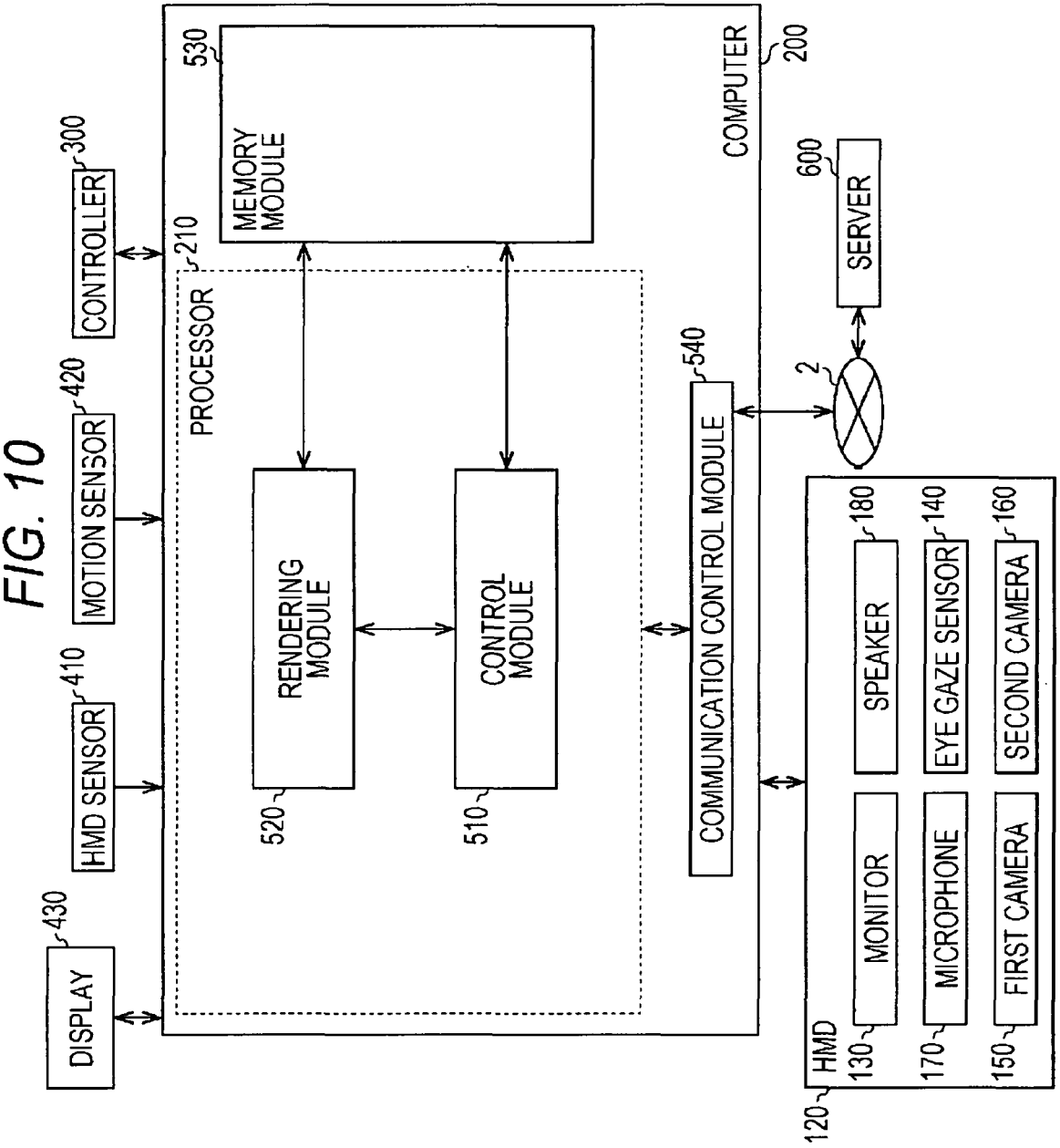
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
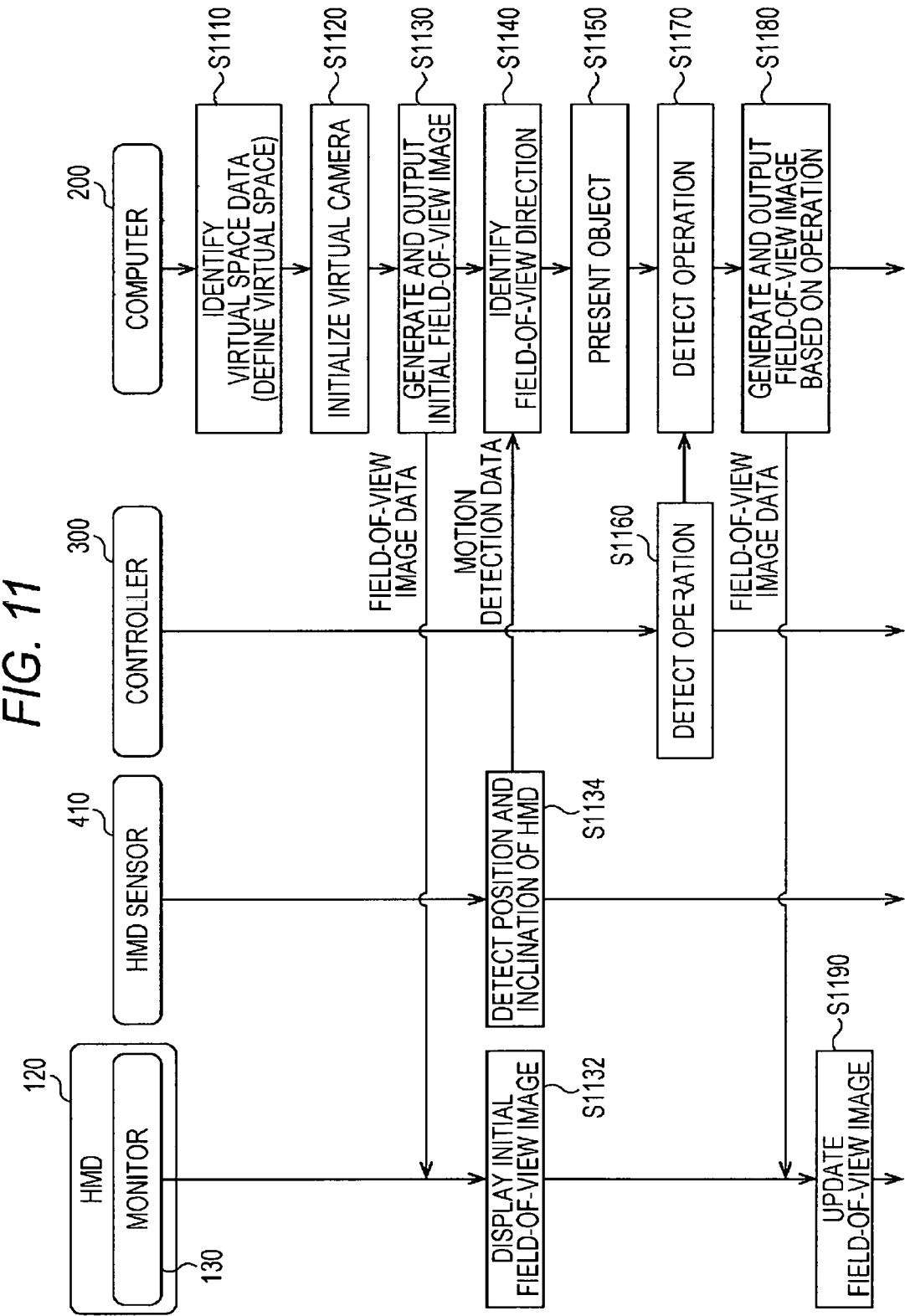
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5.

The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
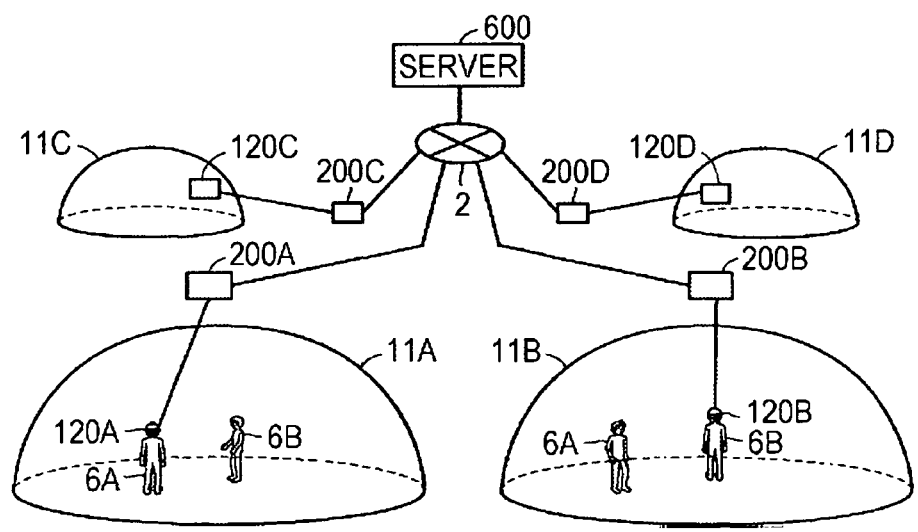
FIG. 12A A schematic diagram of HMD systems of several users sharing the virtual space interact using a network according to at least one embodiment of this disclosure.
Figure 12B:
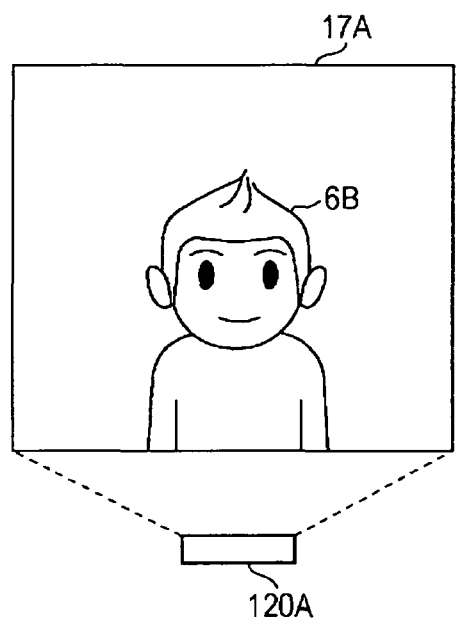
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
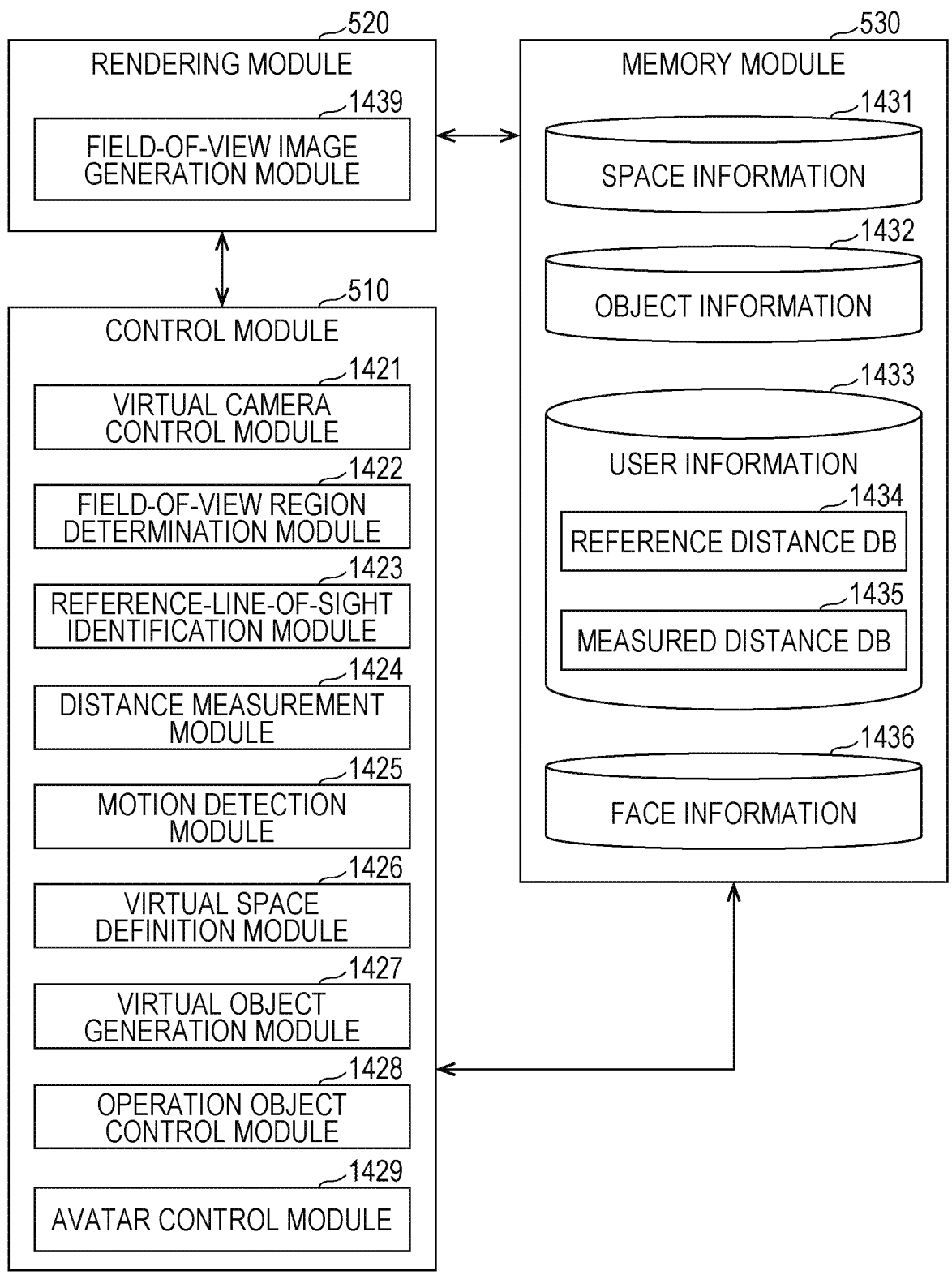
FIG. 14 A block diagram of modules of the computer according to at least one embodiment of this disclosure.

With reference to FIG. 14, a module configuration of the computer 200 are described. FIG. 14 is a block diagram of modules of the computer 200 according to at least one embodiment of this disclosure.

In FIG. 14, the control module 510 includes a virtual camera control module 1421, a field-of-view region determination module 1422, a reference-line-of-sight identification module 1423, a distance measurement module 1424, a motion detection module 1425, a virtual space definition module 1426, a virtual object generation module 1427, an operation object control module 1428, and an avatar control module 1429. The rendering module 520 includes a field-of-view image generation module 1439. The memory module 530 stores space information 1431, object information 1432, user information 1433, and face information 1436.

In at least one aspect, the control module 510 controls image display on the monitor 130 of the HMD 120.

The virtual camera control module 1421 arranges the virtual camera 14 in the virtual space 11. The virtual camera control module 1421 controls a position of the virtual camera 14 in the virtual space 11 and the direction (inclination) of the virtual camera 14. The field-of-view region determination module 1422 defines the field-of-view region 15 in accordance with the direction of the head of the user wearing the HMD 120 and the position of the virtual camera 14. The field-of-view image generation module 1439 generates the field-of-view image 17 to be displayed on the monitor 130 based on the determined field-of-view region 15.

The reference-line-of-sight identification module 1423 identifies the inclination of the HMD 120 based on output from a sensor 114. The reference-line-of-sight identification module 1423 further identifies a line-of-sight direction of the user 5 based on output from the eye gaze sensor 140.

The distance measurement module 1424 measures a distance between the HMD 120 (first camera 150 mounted thereon) and a part of the body of the user 5 excluding the head based on depth information output from the first camera 150. As at least one example, the distance measurement module 1424 measures a distance between the first camera 150 and a shoulder (e.g., acromioclavicular joint or acromion) of the user 5. In at least one aspect, the distance measurement module 1424 may measure a distance between the first camera 150 and a chest (e.g., sternoclavicular joint) of the user 5.

The motion detection module 1425 detects the shape (facial expression of user 5) of each part (e.g., cheeks, mouth, nose, eyes, and eyebrows) forming the face of the user 5 from the face image of the user 5 generated by the first camera 150 and the second camera 160. More specifically, the motion detection module 1425 performs pattern matching using a template image of each part stored in the face information 1436 described later to detect each part from the generated image. After that, the motion detection module 1425 detects position information on feature points (e.g., angle of mouth) forming the shape of each part. This position information is coordinate values in a uvw visual field coordinate system having the position of the first camera 150 as a reference (origin). The motion detection module 1425 configured in this manner may be implemented by FaceRig provided by Holotech Studios.

The control module 510 controls the virtual space 11 provided to the user 5. The virtual space definition module 1426 generates virtual space data representing the virtual space 11, to thereby define the virtual space 11 in the system 100.

The virtual object generation module 1427 generates objects to be arranged in the virtual space 11. The objects may include, for example, forests, mountains, other landscapes, and animals to be arranged in accordance with the progression of the story of the game.

The operation object control module 1428 arranges, in the virtual space 11, an operation object for receiving an operation of the user in the virtual space 11. The user operates the operation object to operate an object arranged in the virtual space 11, for example. In at least one aspect, the operation object is a hand object. The operation object control module 1428 detects the motion of the hand of the user 5 based on output from the motion sensor 420, and translates the motion of the hand in the hand object. This hand object may be a hand of an avatar object described later.

The avatar control module 1429 generates data for arranging an avatar object of the user of another computer 200, which is connected via the network, in the virtual space 11. The avatar control module 1429 controls the motion of the avatar object based on information received from another computer 200.

In at least one aspect, the avatar control module 1429 generates data for arranging an avatar object of the user 5 in the virtual space 11. In at least one aspect, the avatar control module 1429 generates an avatar object simulating the user 5 based on an image including the user 5. In at least one aspect, the avatar control module 1429 generates data for arranging an avatar object in the virtual space 11, which is selected by the user 5 from among a plurality of types of avatar objects (e.g., objects simulating animals or objects of deformed humans).

The avatar control module 1429 translates the motion of the user 5 in the real space in the avatar object. For example, the avatar control module 1429 turns the head without synchronizing the head and body of the avatar object based on a distance (hereinafter also referred to as "measured distance") measured by the distance measurement module 1424. Details of this processing are described later.

In at least one aspect, the avatar control module 1429 translates the facial expression of the user 5 in the avatar object. For example, the avatar control module 1429 sets a vertex corresponding to a feature point of each part forming the face of the user 5, which is detected by the motion detection module 1425, based on vertices of a polygon forming the avatar object. The avatar control module 1429 moves the vertex based on the position of the detected feature point. As a result, the facial expression of the user 5 is translated in the avatar object.

When one object arranged in the virtual space 11 collides with another object, the control module 510 detects the collision. The control module 510 can detect a timing at which a certain object and another object have touched each other, and performs predetermined processing at the time of the detection. The control module 510 can detect a timing at which one object and another object, which have been in contact with each other, become separated from each other, and performs predetermined processing at the time of the detection. The control module 510 can detect a state in which one object and another object are in contact with each other. In at least one embodiment, the control module 510 determines contact between objects in the virtual space based on overlapping coordinates in the virtual space. In at least one embodiment, the control module 510 determines contact between objects in the virtual space based on overlapping of coordinates of at least one collision area of the objects in the virtual space. Specifically, when an operation object and another object have touched each other, the operation object control module 1428 detects the fact that the operation object and the object have touched each other, and performs predetermined processing.

The space information 1431 stores one or more templates that are defined to provide the virtual space 11.

The object information 1432 contains the plurality of panorama images 13 to be developed in the virtual space 11 and data for arranging objects in the virtual space 11. The panorama image 13 may contain a still image and/or a moving image. The panorama image 13 may contain an image in a non-real space and an image (e.g., computer graphics) in the real space.

The user information 1433 stores a program for causing the computer 200 to function as the control device for the system 100, application programs using the various content stored in the object information 1432, and the like.

The user information 1433 further contains a reference distance DB 1434 and a measured distance DB 1435. The reference distance DB 1434 stores identification information (hereinafter also referred to as "user ID") for identifying each of the plurality of users and the reference distance in association with each other. The user ID is, for example, an Internet Protocol (IP) address or a media access control address (MAC) set to the computer 200. The reference distance is a measured distance at a time when the head and body of the user 5 are facing in the same direction (when user 5 is facing in front direction). The measured distance DB 1435 stores the measured distance in a predetermined period (e.g., 1 second) in association with the user ID. The measured distance DB 1435 is stored in a predetermined area functioning as a ring buffer in the memory 220.

The face information 1436 holds a template image of each part forming the face. Those images are used for pattern matching by the motion detection module 1425.

[Processing of Controlling Motion of Avatar Object]

FIGS. 15A-F are a diagrams of processing of turning the head and body of the avatar object 6B according to at least one embodiment of this disclosure. In FIG. 15A, a head 1551B and a body 1552B of the user 5B are facing in the right direction. In FIG. 15B, the head 1551B of the user 5B is facing in a direction perpendicular to the drawing sheet, and the body 1552B is facing in the right direction. In FIG. 15C, the head 1551B and the body 1552B of the user 5B are facing in the direction perpendicular to the drawing sheet. FIG. 15D is an image generated (photographed) by the first camera 150B in FIG. 15A. FIG. 15E is an image generated by the first camera 150B in FIG. 15B. FIG. 15F is an image generated by the first camera 150B in FIG. 15C.

In at least one aspect, the user 5B transitions from FIG. 15A to FIG. 15B, that is, turns the head 1551B to the right (turns head) without synchronizing the head 1551B and the body 1552B. In this case, a sensor 190B provided in the HMD 120B detects a motion (angular velocity) about the yaw axis (v-axis).

In at least one aspect, the user 5B transitions from FIG. 15A to FIG. 15C, that is, turns the head 1551B to the right (turns whole body to right) by synchronizing the head 1551B and the body 1552B. Also in this case, the sensor 190B detects a motion about the yaw axis.

As described above, the sensor 190B detects only the motion of the head 1551B, and does not detect the motion of the body 1552B. Thus, when an output result from the sensor 190B is received, a related-art computer cannot determine whether the user 5B has transitioned from FIG. 15A to FIG. 15B or from FIG. 15A to FIG. 15C. Accordingly, a related-art computer cannot translate an accurate motion of the user 5B in the avatar object 6B. As a result, in some cases, a user using a related-art computer feels strange about the motion of the avatar object 6B, and cannot smoothly communicate to/from the user 5B. In view of this, the avatar control module 1429A in at least one embodiment makes the determination based on the relational information received from the computer 200B.

The relational information represents a positional relationship between the HMD 120B and a part of the body of the user 5B excluding the head 1551B. As an example, the part of the body is assumed to be a right shoulder 1561B. When the user 5B has transitioned from FIG. 15A to FIG. 15C, a positional relationship between the HMD 120B and the right shoulder 1561B does not change. On the contrary, when the user 5B has transitioned from FIG. 15A to FIG. 15C, the positional relationship between the HMD 120B and the right shoulder 1561B changes. For example, a distance between the HMD 120B and the right shoulder 1561B becomes shorter in FIG. 15B than in FIG. 15A. Further, the positions of the right shoulder 1561B in the images FIG. 15D and FIG. 15E are different from each other.

In at least one aspect, the part of the body is an upper half of the body of the user 5B excluding the head 1551B. In this case, an area (dotted region) occupied by the upper half of the body of the user 5B is the same between the image in FIG. 15D and the image in FIG. 15F. On the other hand, an area (dotted region) occupied by the upper half of the body of the user 5B is different between the image in FIG. 15D and the image in FIG. 15E.

The avatar control module 1429A in at least one embodiment utilizes the above-mentioned characteristics to turn a head 1862B without synchronizing the head 1862B and a body 1863B of the avatar object 6B based on the relational information.

Meanwhile, when a person turns his or her head without synchronizing the head and the body in the real space, the person visually recognizes his or her shoulder. Thus, the computer 200A acquires the relational information indicating the positional relationship between the HMD 120A and a part of the body of the user 5A excluding the head, and similarly to the avatar object 6B, the computer 200A controls the motions of the head and body of the avatar object 6A. With this, when the user 5A turns his or her head without synchronizing the head and the body in the real space, the user 5A visually recognizes the shoulder of the avatar object 6A in the virtual space 11A. Accordingly, the view of the user 5A by himself or herself in the real space and the view of the user 5A (avatar object 6A) by himself or herself in the virtual space 11A are the same. As a result, the user 5A may be more immersed in the virtual space 11A.

Figure 16:
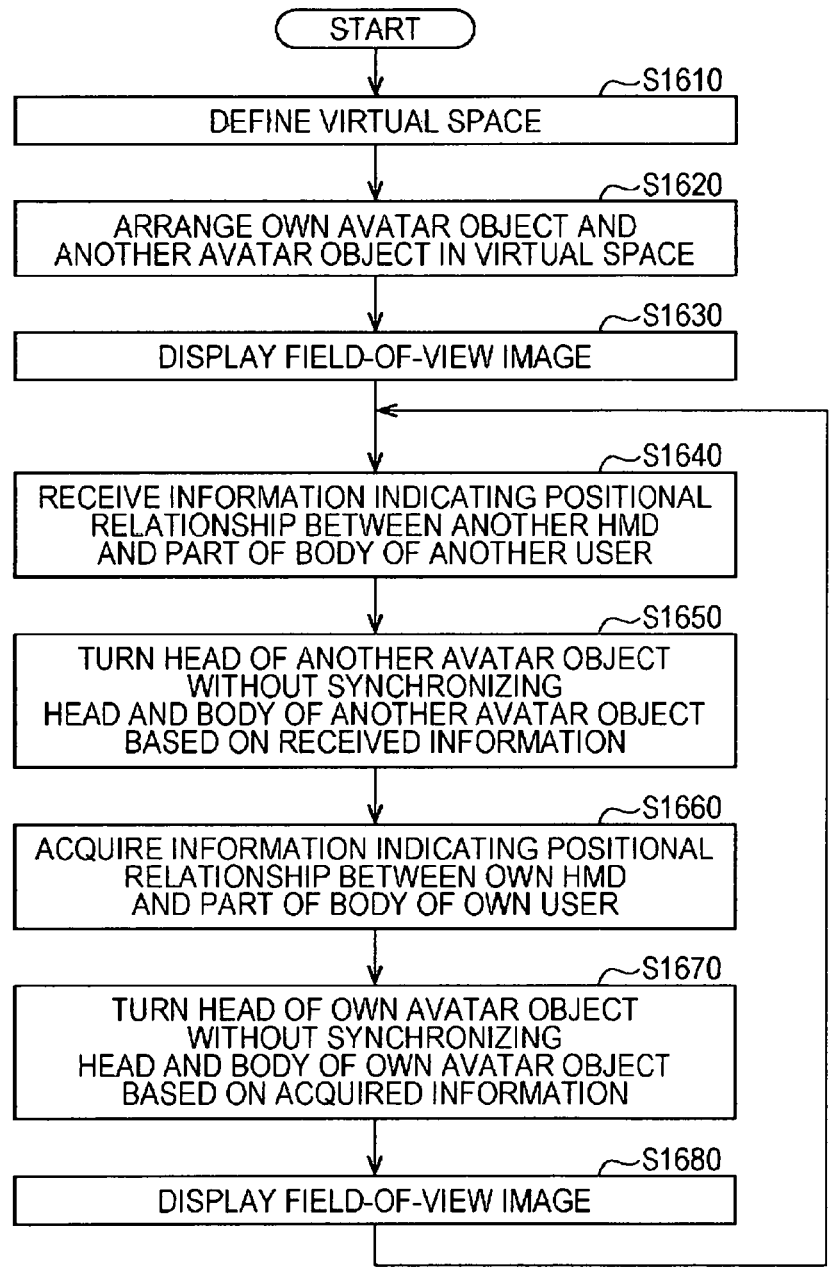
FIG. 16 A flowchart of processing motions of the head and body of the avatar object using relationship information according to at least one embodiment of this disclosure.

FIG. 16 is a flowchart of processing of motions of the head and body of an avatar object by using relational information according to at least one embodiment of this disclosure. The processing of FIG. 16 is executed by the processor 210A of the computer 200A under a state in which the computers 200A and 200B are communicating to/from each other.

In Step S1610, the processor 210A defines the virtual space 11A. In Step S1620, the processor 210A arranges the avatar object 6A ("own avatar object" in FIG. 16) corresponding to the user 5A and the avatar object 6B ("another avatar object" in FIG. 16) corresponding to the user 5B in the virtual space 11A. At this time, the processor 210B also performs processing similar to those of Step S1610 and Step S1620.

In Step S1630, the processor 210A outputs the field-of-view image 17A photographed by the virtual camera 14A to the monitor 130A. With this, the user 5A visually recognizes the virtual space 11A.

In Step S1640, the processor 210A receives relational information from the computer 200B. This relational information indicates a positional relationship between a part of the body of the user 5B ("another user" in FIG. 16) excluding the head and the HMD 120B ("another HMD" in FIG. 16).

In Step S1650, the processor 210A serves as the avatar control module 1429A to turn the head without synchronizing the head and body of the avatar object 6B based on the received relational information.

In Step S1660, the processor 210A acquires relational information indicating a positional relationship between the HMD 120A ("own HMD" in FIG. 16) and a part of the body of the user 5A ("own user" in FIG. 16) excluding the head.

In Step S1670, the processor 210A turns the head without synchronizing the head and body of the avatar object 6A based on the received relational information.

In Step S1680, the processor 210A outputs the field-of-view image 17A photographed by the virtual camera 14A to the monitor 130A. With this, the field-of-view image 17A visually recognized by the user 5A is updated. After that, the processor 210A executes the processing of Step S1640 again.

As described above, the user 5A can recognize an accurate motion of the user 5B in the virtual space 11A via the avatar object 6B. As a result, the user 5A can smoothly communicate to/from the user 5B.

[Relational Information—Distance]

Next, a specific description is given of processing of from Step S1640 to Step S1670 in FIG. 16. The processing of Step S1660 and Step S1670 is substantially similar to the processing of Step S1640 and Step S1650. Thus, in the following, a specific description is given of the processing of Step S1640 and Step S1650, but this processing can also be applied to the processing of Step S1660 and Step S1670. First, a description is given of a case in which the relational information indicates a distance between the HMD 120 and a part of the body of the user 5 excluding the head.

[Processing Based on Differential Distance]

The processor 210B of the computer 200B in at least one embodiment serves as the distance measurement module 1424B to measure a distance between the HMD 120B and a part of the body of the user 5B excluding the head.

In the example of FIGS. 15A-F, the distance measurement module 1424B detects a distance (measured distance) DIS between the first camera 150B and the right shoulder 1561B based on depth information output from the first camera 150B. The right shoulder 1561B corresponds to, for example, an acromioclavicular joint of the right shoulder.

In FIG. 15A, the user 5B is facing forward (head 1551B and body 1552B are facing in same direction). The distance measurement module 1424B detects the measured distance DIS in this state as the reference distance. In at least one aspect, the processor 210B gives an instruction to the user 5B so that the user 5B does not turn his or her head, and detects the reference distance at that time.

After the transition from FIG. 15A to FIG. 15B, the measured distance DIS becomes shorter than the reference distance. Meanwhile, the measured distance DIS remains to be the same as the reference distance even after the transition from FIG. 15A to FIG. 15C. In this manner, a differential distance obtained by subtracting the measured distance from the reference distance correlates with a turning angle of the head 1551B with respect to the body 1552B based on the yaw axis. More specifically, when the differential distance is a positive value, the head 1551B is turned in the right direction with respect to the body 1552B. On the contrary, when the differential distance is a negative value, the head 1551B is turned in the left direction with respect to the body 1552B. As an absolute value of the differential distance becomes larger, the turning angle also becomes larger. When the differential distance is 0, the head 1551B is not turned with respect to the body 1552B.

The avatar control module 1429A in at least one embodiment uses the above-mentioned correlation to control the motions of the head 1862B and the body 1863B of the avatar object 6B. Specifically, the computer 200A receives the reference distance and the measured distance DIS from the computer 200B. The avatar control module 1429A turns the head 1862B without synchronizing the head 1862B and the body 1863B so that the turning angle of the head 1862B with respect to the body 1863B is a turning angle corresponding to the differential distance. With the above-mentioned configuration, the avatar control module 1429A can translate the motion of the user 5B in the avatar object 6B accurately.

In at least one aspect, the computer 200A stores a relational expression between the differential distance and the turning angle in the storage 230 in advance. The avatar control module 1429A turns the head 1862B with respect to the head 1862B based on the relational expression.

In at least one aspect, when the processor 210B detects the reference distance, the processor 210B acquires a measured distance in a state in which the user 5B has turned his or her head. The processor 210B calculates the above-mentioned relational expression based on the differential distance and a degree of turning of the head (turning angle of head 1551B with respect to body 1552B). The processor 210B transmits the calculated relational expression to the computer 200A. The computer 200A turns the head 1862B of the avatar object 6B with respect to the body 1863B in accordance with the received relational expression. With the above-mentioned configuration, the avatar control module 1429A can translate the motion of the user 5B in the avatar object 6B more accurately.

Figure 17:
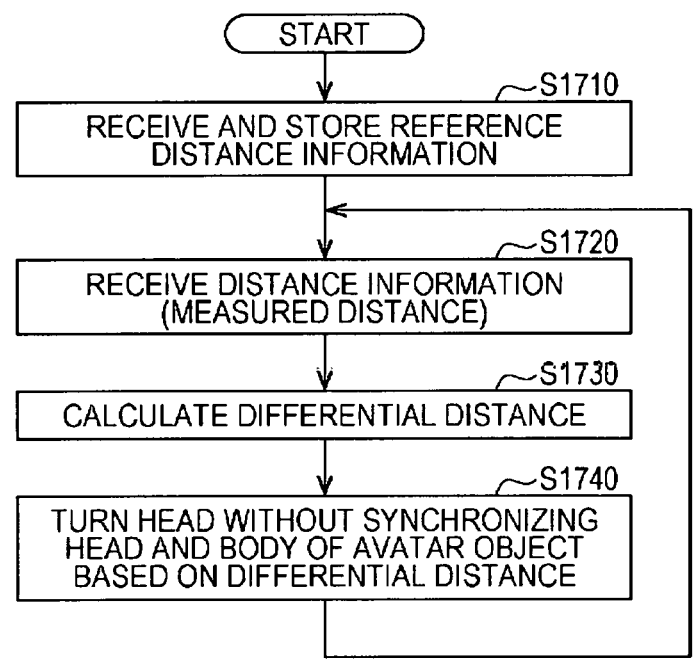
FIG. 17 A flowchart of processing of motion of the head and the body of the avatar object in a case of using a differential distance according to at least one embodiment of this disclosure.

FIG. 17 is a flowchart of processing of Step S1640 and Step S1650 of FIG. 16 in a case where the differential distance is used according to at least one embodiment of this disclosure. The processing of FIG. 17 is executed by the processor 210A of the computer 200A.

In Step S1710, the processor 210A receives information (reference distance information) indicating the reference distance and the user ID of the user 5B from the computer 200B, and stores those pieces of information into the reference distance DB 1434A in association with each other.

In Step S1720, the processor 210A receives information (distance information) indicating the measured distance and the user ID from the computer 200B, and stores those pieces of information into the measured distance DB 1435A in association with each other.

In Step S1730, the processor 210A calculates a differential distance obtained by subtracting the measured distance from the reference distance.

Figure 18:
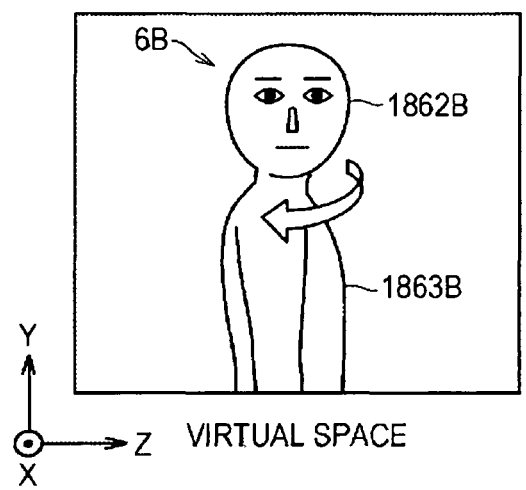
FIG. 18 A diagram of a situation in which the head of the avatar object is turning without synchronization with the body of the avatar object according to at least one embodiment of this disclosure.

In Step S1740, the processor 210A serves as the avatar control module 1429A to turn the head 1862B without synchronizing the head 1862B and the body 1863B of the avatar object 6B based on the calculated differential distance (refer to FIG. 18). After that, the processor 210A executes the processing of Step S1720 again.

According to the above-mentioned configuration, the processor 210A according to at least one embodiment can control the motions of the head 1862B and the body 1863B of the avatar object 6B based on the relational information indicating the distance between the HMD 120B and a part of the body of the user 5B.

[Processing of Moving Head and Body in Synchronization with Each Other]

In at least one aspect, in FIG. 17, the processor 210A repeatedly executes the following processing in addition to the processing of from Step S1720 to Step S1740. The computer 200A receives an angular velocity about the yaw axis, which is output by the sensor 190B, from the computer 200B. The processor 210A serves as the avatar control module 1429A to calculate the turning angle of the HMD 120B about the yaw axis based on the received angular velocity about the yaw axis.

The avatar control module 1429A further calculates a turning angle (hereinafter also referred to as "synchronized angle") obtained by subtracting the angle turned in Step S1740 from the calculated turning angle. The avatar control module 1429A turns the head 1862B and the body 1863B of the avatar object 6B in synchronization with each other by the synchronized angle (refer to FIG. 19).

According to the above-mentioned configuration, the avatar control module 1429A can translate the motion of the user 5B in the avatar object 6B more accurately.

[Correction Processing]

In FIGS. 15A-F, the user 5B turns the head only about the yaw axis, but in at least one aspect, the user 5B may turn the head about the pitch axis or the roll axis. In this case, the measured distance DIS changes. For example, when the head of the user 5B faces upward with respect to the pitch axis, the measured distance DIS becomes larger.

In view of the above, the distance measurement module 1424B according to at least one aspect corrects the measured distance DIS. More specifically, the processor 210B calculates a pitch angle ($\theta u$) and a roll angle ($\theta w$) based on the angular velocity about the pitch axis or the roll axis, which is detected by the sensor 190B. The distance measurement module 1424B uses a trigonometric function that follows the calculated pitch angle and roll angle to calculate the measured distance DIS in a case where the pitch angle and roll angle are 0°. The computer 200B transmits the corrected measured distance DIS to the computer 200A. The computer 200A controls the motions of the head 1862B and the body 1863B of the avatar object 6B in accordance with the corrected measured distance DIS.

According to the above-mentioned configuration, the HMD system 100 can translate the motion of the user in the avatar object more accurately.

[Processing Based on Change in Measured Distance with Respect to Time]

In at least the above-mentioned example, the processor 210A is configured to control the motion of the avatar object 6B based on the differential distance, but in at least one aspect, the processor 210A may control the motion of the avatar object 6B based on the change in measured distance DIS with respect to time. The amount of change in measured distance DIS with respect to time may also be referred to as an angular velocity of the head 1551B of the user 5B with respect to the body 1552B based on the yaw axis.

Figure 20:
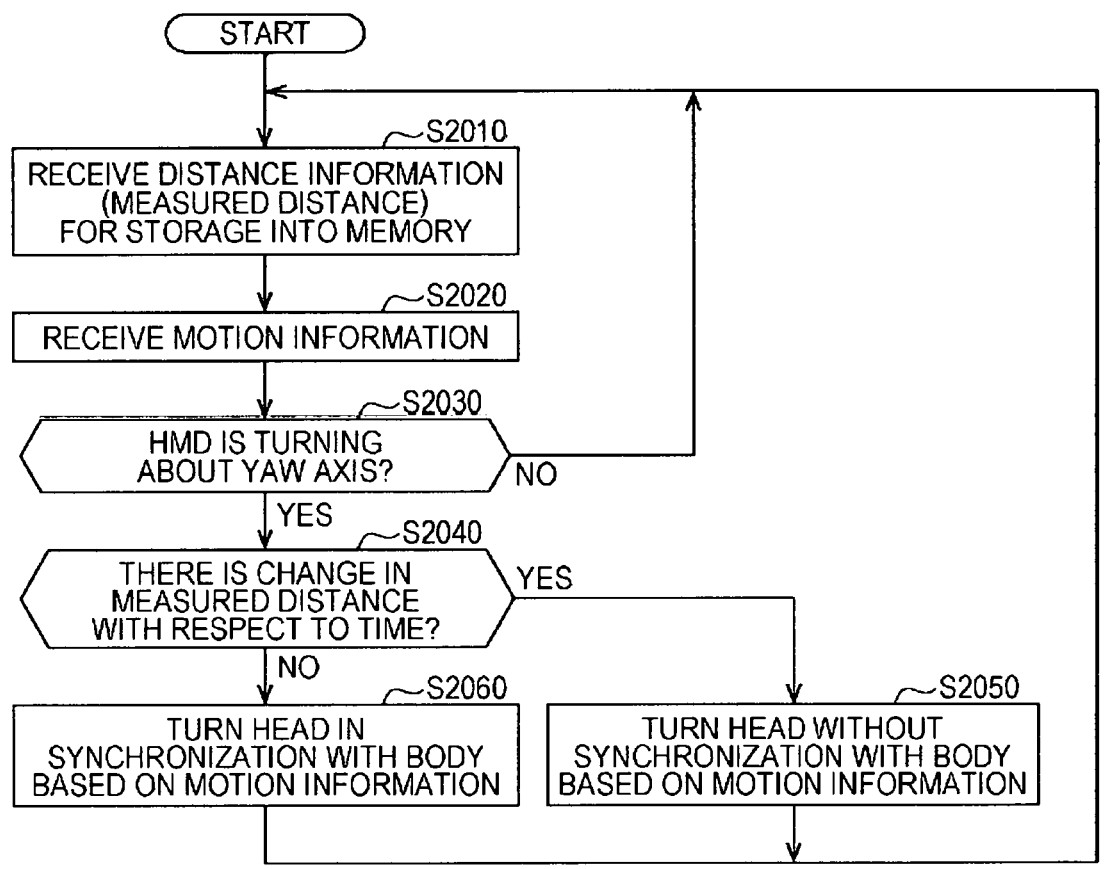
FIG. 20 A flowchart of processing of motion of the head and the body of the avatar object in a case where an amount of change in measured distance with respect to time is used according to at least one embodiment of this disclosure.

FIG. 20 is a flowchart of the processing of Step S1640 and Step S1650 of FIG. 16 in a case where the amount of change in measured distance DIS with respect to time is used according to at least one embodiment of this disclosure. The processing of FIG. 20 is executed by the processor 210A of the computer 200A.

In Step S2010, the processor 210A receives information (distance information) indicating the measured distance from the computer 200B, and stores the information into the measured distance DB 1435A. In at least one aspect, the computer 200B transmits the corrected measured distance described above to the computer 200A.

In Step S2020, the processor 210A receives output (motion information) of the sensor 190B from the computer 200B.

In Step S2030, the processor 210A determines whether the HMD 120B is turning about the yaw axis based on the received motion information. For example, when the angular velocity about the yaw axis exceeds a threshold value determined in advance, the processor 210A determines that the HMD 120B is turning about the yaw axis.

When the processor 210A determines that the HMD 120B is turning about the yaw axis (YES in Step S2030), the processor 210A advances the processing to Step S2040. Otherwise (NO in Step S2030), the processor 210A executes the processing of Step S2010 again.

In Step S2040, the processor 210A refers to a plurality of measured distances stored in the measured distance DB 1435A to determine whether there is a change in measured distance with respect to time. For example, when the amount of change in measured distance with respect to time exceeds an amount determined in advance, the processor 210A determines that there is a change in measured distance with respect to time.

When the processor 210A determines that there is a change in measured distance with respect to time (YES in Step S2040), the processor 210A advances the processing to Step S2050. Otherwise (NO in Step S2040), the processor 210A advances the processing to Step S2060.

In Step S2050, the processor 210A serves as the avatar control module 1429A to turn the head 1862B without synchronizing the head 1862B and the body 1863B of the avatar object 6B based on the received motion information (angular velocity about yaw axis) (refer to FIG. 18).

Figure 19:
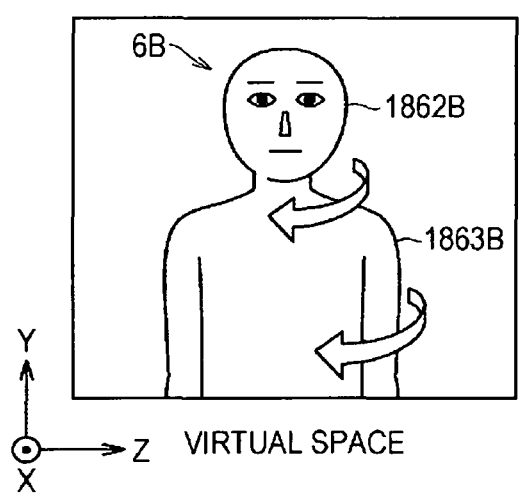
FIG. 19 A diagram of a situation in which the head and body of the avatar object are turning in synchronization with each other according to at least one embodiment of this disclosure.

In Step S2060, the processor 210A serves as the avatar control module 1429A to turn the head 1862B by synchronizing the head 1862B and the body 1863B of the avatar object 6B based on the received motion information (angular velocity about yaw axis) (refer to FIG. 19).

According to the above-mentioned configuration, the avatar control module 1429A according to at least one embodiment can control the motions of the head 1862B and the body 1863B of the avatar object 6B based on the change in measured distance with respect to time.

[Relational Information—Angle]

In at least the example described above, the relational information indicates a distance. In at least one aspect, the relational information indicates an angle. As at least one example, the relational information indicates an angle (hereinafter also referred to as "angle θtw") formed by the HMD 120 (first camera 150 provided therein) and a part of the body of the user 5 based on the yaw axis.

Figure 21:
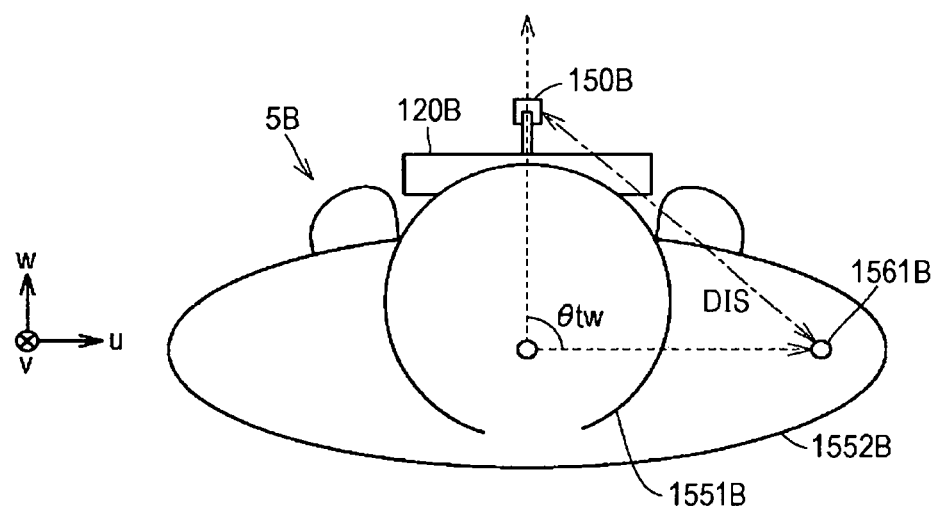
FIG. 21 A diagram of the user as viewed from the above according to at least one embodiment of this disclosure.

FIG. 21 is a diagram of the user 5B as viewed from the above according to at least one embodiment of this disclosure. In FIG. 21, when the user 5B is facing forward in the real space, the angle θtw formed by the first camera 150B and the right shoulder 1561B based on the axis (yaw axis) of the body of the user 5B is 90°. When the head 1551B is turned right without synchronization with the body 1552B of the user 5B, the angle θtw becomes smaller and the measured distance DIS becomes smaller. On the contrary, when the head 1551B is turned left without synchronization with the body 1552B of the user 5B, the angle θtw becomes larger and the measured distance DIS also becomes larger. In this manner, the measured distance DIS and the angle θtw correlate with each other.

The computer 200B according to at least one embodiment uses the above-mentioned correlation to calculate the angle θtw from the measured distance DIS. The computer 200B transmits the relational information indicating the angle θtw to the computer 200A.

The computer 200A may be configured to control the motions of the head 1862B and the body 1863 of the avatar object 6B based on the received angle θtw.

[Relational Information—Image]

Further, in at least one aspect, the relational information may be an image containing a part of the body of the user 5. Now, a description is given of processing of controlling motions of the head and the body of the avatar object 6 by using an image.

Referring back to FIGS. 15A-F again, the position of the right shoulder 1561B (part of body) is positioned on the left side in the images in FIG. 15D and FIG. 15F. Meanwhile, the position of the right shoulder 1561B is positioned substantially at the center in the image in FIG. 15E.

The area (dotted region) occupied by the upper half (part of body) of the body of the user 5B excluding the head 1551B in the image in FIG. 15E is smaller than the area occupied by the upper half of the body of the user 5B excluding the head 1551B in the images in FIG. 15D and FIG. 15F.

In this manner, the turning angle of the head 1551B of the user 5B with respect to the body 1552B based on the yaw axis and how (e.g., position and area) a part of the body of the user 5B is shown in the image correlate with each other. In view of the above, the avatar control module 1429A according to at least one embodiment controls the motions of the head 1862B and the body 1863B of the avatar object 6B based on an image generated by the first camera 150B.

In at least one aspect, the computer 200A receives a reference image in a state in which the user 5B is facing forward from the computer 200B. The processor 210A identifies the position (reference position) of a part of the body in the reference image. The processor 210A calculates a horizontal component (component in length direction in images in FIGS. 15D-F) (number of pixels) of a distance between the position of the part of the body and the reference position in the image received from the computer 200B. The processor 210A serves as the avatar control module 1429A to increase the amount of turning of the head 1862B without synchronizing the head 1862B and the body 1863B as the calculated horizontal component becomes larger.

In at least one aspect, the processor 210A calculates an area occupied by a part of the body in the reference image. As at least one example, the processor 210A performs pattern matching between the reference image and a template image of a part of the body to identify the part occupied by the part of the body in the reference image. The processor 210A calculates the area (reference area) (number of pixels) of that part. Similarly, the processor 210A calculates the area occupied by a part of the body in an image received from the computer 200B, and further calculates a difference from the reference area. The processor 210A serves as the avatar control module 1429A to increase the amount of turning of the head 1862B without synchronizing the head 1862B and the body 1863B as the calculated difference becomes larger.

FIG. 22 is a flowchart of processing of Step S1640 and Step S1650 of FIG. 16 in a case where an image is used. The processing of FIG. 22 is executed by the processor 210A of the computer 200A.

In Step S2210, the processor 210A receives an image generated by the first camera 150B installed in the HMD 120B used by the user 5B.

In Step S2220, the processor 210A identifies a part (e.g., right shoulder or upper half of body) of the body of the user 5B from the received image.

In Step S2230, the processor 210A serves as the avatar control module 1429A to turn the head 1862B without synchronizing the head 1862B and the body 1863B of the avatar object 6B based on how (e.g., position and area) a part of the body of the user 5B is shown in the received image.

According to the above-mentioned configuration, the avatar control module 1429A can translate the motion of the user 5B in the avatar object 6B accurately.

[Configurations]

The technical features of at least one embodiment are summarized in the following manner.

(Configuration 1)

There is provided a method to be executed by a computer 200A to communicate via a virtual space 11A. The method includes defining (S1610) the virtual space 11A. The method further includes arranging (S1620), in the virtual space 11A, an avatar object 6B corresponding to a user 5B performing communication via the virtual space 11A. The method further includes receiving (S1640) information indicating a positional relationship between an HMD 120B used by the user 5B and a part of a body of the user 5B excluding a head. The method further includes turning (S1650) the head 1862B without synchronizing the head 1862B and the body 1863B of the avatar object 6B based on information indicating the positional relationship.

According to the above-mentioned configuration, the computer 200A can translate the motion of the user 5B in the avatar object 6B accurately. As a result, the user 5A can communicate to/from the user 5B via the avatar object 6B smoothly.

(Configuration 2)

In Configuration 1, the part of the body includes a shoulder of the user 5B. More specifically, the part of the body includes an acromioclavicular joint or an acromion. In at least one aspect, the part of the body includes a chest (e.g., sternoclavicular joint) of the user 5B. Further, in at least one aspect, the part of the body includes a plurality of points (e.g., right shoulder and left shoulder).

(Configuration 3)

In Configuration 1 or Configuration 2, the information indicating the positional relationship contains distance information indicating a distance between the HMD 120B and the part of the body.

(Configuration 4)

In Configuration 3, the distance information indicates a distance between the part of body and a first camera 150, which is provided in the HMD 120B to photograph a face and the part of the body of the user 5B.

According to the above-mentioned configuration, an HMD set 110B can use the first camera 150B for detecting the facial expression of the user 5B to measure the distance without using an additional device for measuring the distance. As a result, the HMD system 100 can reduce the size and cost of each HMD set 110.

(Configuration 5)

The method according to Configuration 3 or Configuration 4 further includes receiving (S2020) motion information (output of sensor 190B) indicating a motion of the HMD 120B. The turning of the head includes turning (S2050) the head based on the distance information and the motion information.

(Configuration 6)

The method according to any one of Configurations 3 to Configuration 5 further includes receiving (S1710) information indicating a reference distance, which is a distance between the HMD 120B and the part of the body in a state in which the head and the body of the user 5B are facing in the same direction. The turning of the head without synchronizing the head and the body includes turning (S1740) the head without synchronizing the head and the body of the avatar object 6B based on a difference between a distance indicated by the distance information and the reference distance.

(Configuration 7)

The method according to any one of Configurations 3 to Configuration 6 further includes receiving motion information indicating a motion of the HMD 120B, wherein the motion information indicates a fact that the HMD 120B is turning about an axis of the body of the user 5B (YES in S2030). The method further includes turning (S2060) the head by synchronizing the head and the body of the avatar object 6B when there is no change in distance indicated by the distance information with respect to time (NO in S2040).

(Configuration 8)

In Configuration 1 or Configuration 2, the information indicating the positional relationship contains an angle θtw formed by the HMD 120B and the part of the body about an axis of the body.

(Configuration 9)

In Configuration 1 or Configuration 2, the information indicating the positional relationship includes an image containing the part of the body, which is generated by a camera provided in the HMD 120B. The method further includes identifying (S2220) the part of the body from the image. The turning of the head includes turning (S2230) the head without synchronizing the head and the body of the avatar object 6B based on how the part of the body is shown in the image.

(Configuration 10)

In at least one aspect, there is provided a method to be executed by a computer 200A to provide an HMD 120A with a virtual space 11A. The method includes defining (S1610) a virtual space. The method further includes arranging (S1620) an avatar object 6A corresponding to a user 5A of the HMD 120A in the virtual space 11A. The method further includes acquiring (S1660) information indicating a positional relationship between the HMD 120A and a part of the body of the user 5A excluding a head. The method further includes turning (S1670) the head of the avatar object without synchronizing the head and the body of the avatar object based on the information indicating the positional relationship.

According to the above-mentioned configuration, the user 5A in the real space and the user 5A (avatar object 6A) in the virtual space 11A look the same for the user 5A. As a result, the user 5A may be more immersed in the virtual space 11A.

One of ordinary skill in the art would understand that the embodiments disclosed herein are merely examples in all aspects and in no way intended to limit this disclosure. The scope of this disclosure is defined by the appended claims and not by the above description, and this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

The invention claimed is:

1. A method comprising:
    defining a virtual space far presentation on a head-mounted display (HMD), wherein the virtual space comprises a first avatar object corresponding to a user and the first avatar object includes a first virtual head and a first virtual body;
    receiving first information, wherein the first information contains information indicating a relationship between a first direction indicating a direction in which a real body of the user is facing and a second direction indicating a direction in which a real head of the user is facing;

determining in which of a first mode or a second mode the first avatar object is to be controlled based on the first information;

controlling the first avatar object without synchronizing movement of the first virtual head and movement of the first virtual body in response to the first mode being set; and controlling the first avatar object so that the movement of the first virtual head and the movement of the first virtual body are synchronized with each other in response to the second mode being set.

2. The method according to claim 1, further comprising:
moving the first virtual head so that the first virtual head faces in the first direction;
controlling the first virtual body so that the first virtual body is prevented from facing in the first direction in response to the first mode being set; and
controlling the first virtual body so that the first virtual body faces in the first direction in response to the second mode being set.

3. The method according to claim 1, further comprising:
identifying satisfaction of a predetermined relationship between a position of a real shoulder of the user and the first direction;
setting the first mode in response to the satisfaction of the predetermined relationship between the position of the real shoulder of the user and the first direction; and
setting the second mode in response to failure to satisfy the predetermined relationship between the position of the real shoulder of the user and the first direction.

4. The method according to claim 1, further comprising:
setting the first mode in response to a distance between a predetermined position on the user and a position of a real shoulder of the user being equal to or smaller than a first distance; and
setting the second mode in response to the distance between the predetermined position on the user and the position of the real shoulder being larger than the first distance.

5. The method according to claim 4, further comprising:
receiving, from a camera in the HMD, depth information in a real space including a real face and the real shoulder of the user; and
determining the distance between the predetermined position on the user and the position of the real shoulder based on the depth information.

6. The method according to claim 1, further comprising:
detecting motion of the real head of the user; and
determining in which of the first mode or the second mode the first avatar object is to be controlled in response to detecting turning of the real head.

7. The method according to claim 1, further comprising:
identifying an angle formed by the first direction and the second direction;
setting the first mode in response to the angle being equal to or smaller than a threshold value; and
setting the second mode in response to the angle being larger than the threshold value.

8. The method according to claim 1, further comprising identifying an angle based on a distance between a predetermined position in the first direction and a position of a real shoulder of the user.

9. The method according to claim 1, further comprising:
receiving, from a camera of the HMD, an image including a real face and the real shoulder of the user; and
identifying the relationship between the first direction and the second direction based on a positional relationship between the real face and the real shoulder contained in the image.

10. The method according to claim 1, further comprising:
defining a visual field in the virtual space in accordance with a motion of the HMD for a second user;
generating a visual-field image corresponding to the visual field; and
outputting the visual-field image including the first avatar object to the HMD.

11. A method comprising:
defining a virtual space for presentation on a head-mounted display (HMD), wherein the virtual space comprises a first avatar object corresponding to a user and the first avatar object includes a first virtual head and a first virtual body;
detecting relative movement between a real head of the user and a real body of the user;
controlling the first avatar object without synchronizing movement of the first virtual head and movement of the first virtual body in response to the detected relative movement being below a threshold value; and
controlling the first avatar object so that the movement of the first virtual head and the movement of the first virtual body are synchronized with each other in response to the detected relative movement being equal to or greater than the threshold value.

12. The method according to claim 11, wherein the detecting the relative movement comprises capturing an image of a real face of the user and a real shoulder of the user using a camera in the HMD.

13. The method according to claim 12, wherein the detecting the relative movement comprises determining a portion of the real shoulder captured by the camera.

14. The method according to claim 11, wherein the detecting the relative movement comprises detecting a change in distance between the real head of the user and a real shoulder of the user.

15. The method according to claim 11, wherein the detecting the relative movement comprises detecting a change in distance between the real head of the user and a real shoulder of the user with respect to time.

16. The method according to claim 11, wherein the detecting the relative movement comprises detecting a change in an angle between a first direction in which the real head is facing and a second direction extending from the real head to a real shoulder of the user.

17. The method according to claim 11, further comprising:
detecting motion of the HMD; and
turning the virtual head in response to the detected motion of the HMD.

18. A system comprising:
a non-transitory computer readable medium configured to store instructions thereon; and
a processor connected to the non-transitory computer readable medium, wherein the processor is configured to execute the instructions for:
defining a virtual space for presentation on a head-mounted display (HMD), wherein the virtual space comprises a first avatar object corresponding to a user and the first avatar object includes a first virtual head and a first virtual body;

receiving first information, wherein the first information contains information indicating a relationship between a first direction indicating a direction in which a real body of the user is facing and a second direction indicating a direction in which a real head of the user is facing;

determining in which of a first mode or a second mode the first avatar object is to be controlled based on the first information;

controlling the first avatar object without synchronizing movement of the first virtual head and movement of the first virtual body in response to the first mode being set; and controlling the first avatar object so that the movement of the first virtual head and the movement of the first virtual body are synchronized with each other in response to the second mode being set.

19. The system according to claim 18, further comprising the HMD, wherein the processor is configured to receive the first information from the HMD.

20. The system according to claim 19, wherein the HMD comprises a camera configured to capture an image of a real face of the user and a real shoulder of the user, and the first information is based on the captured image.

* * * * *